(12) United States Patent
Jiang et al.

(10) Patent No.: US 10,876,034 B1
(45) Date of Patent: Dec. 29, 2020

(54) MODIFIED SILICON DIOXIDE MATERIAL OF FLUOROCARBON ACTIVE AGENT TYPE SUPER-AMPHIPHOBIC CUTTING-CARRYING AGENT SUITABLE FOR WATER-BASED DRILLING FLUID AND PREPARATION METHOD THEREOF

(71) Applicant: CHINA UNIVERSITY OF PETROLEUM (BEIJING), Beijing (CN)

(72) Inventors: Guancheng Jiang, Beijing (CN); Xiaoxiao Ni, Beijing (CN); Yinbo He, Beijing (CN); Lili Yang, Beijing (CN); Tengfei Dong, Beijing (CN); Kun Zhang, Beijing (CN); Xuwu Luo, Beijing (CN); Li Zhao, Beijing (CN); Yang Bai, Beijing (CN); Kaihe Lv, Beijing (CN); Xianbin Huang, Beijing (CN); Jingping Liu, Beijing (CN); Chunyao Peng, Beijing (CN)

(73) Assignee: CHINA UNIVERSITY OF PETROLEUM (BEIJING), Beijing (CN)

( * ) Notice: Subject to any disclaimer, the term of this patent is extended or adjusted under 35 U.S.C. 154(b) by 0 days.

(21) Appl. No.: 16/746,230

(22) Filed: Jan. 17, 2020

(51) Int. Cl.
  *C09K 8/52* (2006.01)
  *C09C 1/30* (2006.01)
  *C09K 8/06* (2006.01)

(52) U.S. Cl.
  CPC .............. *C09K 8/52* (2013.01); *C09C 1/3081* (2013.01); *C09K 8/06* (2013.01); *C01P 2004/62* (2013.01); *C01P 2004/64* (2013.01)

(58) Field of Classification Search
  None
  See application file for complete search history.

(56) References Cited

U.S. PATENT DOCUMENTS

| 2005/0197258 A1 | 9/2005 | Nguyen |
| 2015/0275615 A1 | 10/2015 | Rytlewski et al. |

FOREIGN PATENT DOCUMENTS

| CN | 101818050 A | 9/2010 |
| CN | 103214631 A | 7/2013 |
| CN | 103725278 A | 4/2014 |
| CN | 104327225 A | 2/2015 |
| CN | 105802593 A | 7/2016 |
| CN | 105924599 A | 9/2016 |
| CN | 107082856 * | 8/2017 |
| CN | 108165241 A | 6/2018 |
| CN | 109337657 A | 2/2019 |
| EP | 1394355 A1 | 3/2004 |
| JP | 2012167262 * | 9/2012 |

OTHER PUBLICATIONS

JP2012167262 english translation (Year: 2012).*
CN107082856 english translation (Year: 2017).*
Wang, Jing et al., "Preparation and Properties of Fluorinated Low Surface Energy Modified Superamphiphobic Coatings"; Journal of Surface Technology Nov. 2018 vol. 47 No. 11.

* cited by examiner

*Primary Examiner* — Jeffrey D Washville
(74) *Attorney, Agent, or Firm* — Calfee, Halter & Griswold LLP

(57) ABSTRACT

The present disclosure relates to the technical field of oil and gas drilling, and particularly relates to a modified silicon dioxide material of a fluorocarbon active agent type super-amphiphobic cutting-carrying agent suitable for a water-based drilling fluid, and a preparation method thereof. The preparation method of the modified silicon dioxide material comprises the following steps: subjecting silicon dioxide and a silane coupling agent represented by Formula (1) to a first contact reaction in a mixed solvent containing alcohol and water; subjecting the product of the first contact reaction, the compound represented by Formula (2) and the compound represented by Formula (3) to a second contact reaction; subjecting the product of the second contact reaction and the compound represented by Formula (4) to a third contact reaction. The modified silicon dioxide material can be used as a cutting-carrying agent in a water-based drilling fluid and produce an excellent cutting-carrying effect.

Formula (1)

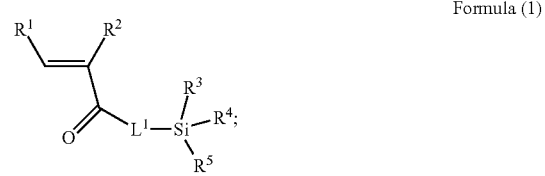

Formula (2)

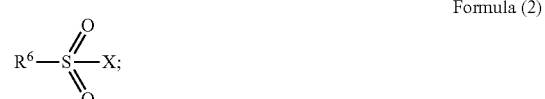

Formula (3)

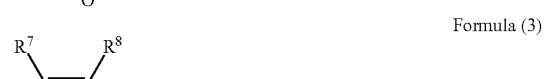

Formula (4)

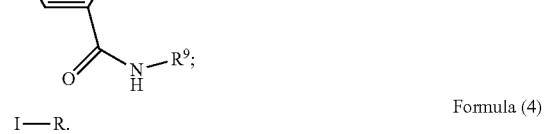

7 Claims, No Drawings

MODIFIED SILICON DIOXIDE MATERIAL OF FLUOROCARBON ACTIVE AGENT TYPE SUPER-AMPHIPHOBIC CUTTING-CARRYING AGENT SUITABLE FOR WATER-BASED DRILLING FLUID AND PREPARATION METHOD THEREOF

FIELD

The present disclosure relates to the technical field of oil and gas drilling, and particularly relates to a modified silicon dioxide material of a fluorocarbon active agent type super-amphiphobic cutting-carrying agent suitable for a water-based drilling fluid, and a preparation method and application thereof.

BACKGROUND

The exploitation of oil fields in China substantially enters the middle and later stages, the oil reservoir conditions for exploration and development are increasingly tough, the wells (e.g., deep wells and horizontal wells) having unconventional and complex structures have increasingly become the mainstream development modes of the unconventional oil and gas fields. The special well types impose higher requirements on the performance of the drilling fluids, as the process of drilling wells with high difficulty often confronts with the problem that it is difficult to carry the rock cutting, the residual cutting is prone to form a rock cutting bed under the shaft, the rock cutting bed further results in an increased grinding resistance and torque, or even cause sticking of the drilling tool, which gives rise to the large-scale and serious drilling accidents, thereby affecting the drilling efficiency and causing the huge cost consumption. Therefore, the water-based drilling fluids may have desirable cutting-carrying properties, which in turn imposes extremely high requirements on the rheological property of the water-based drilling fluids.

The water-based drilling fluid has been widely used due to the environmentally-friendly and low cost characteristics, the water-based drilling fluid is mainly consisting of bentonite, a variety of polymers and a weighting material. In order to produce a desirable cutting-carrying effect, a large amount of bentonite and polymer are usually added into the water-based drilling fluid, which in turn reduces the drilling speed of the boreholes and forms thicker filter cakes, and causes accidents such as clinging and sticking of the drill tool. Therefore, it is necessary to develop a water-based drilling fluid system with high efficiency for carrying cuttings to improve the drilling speed, and solve the cutting-carrying problem of the wells (e.g., deep wells and horizontal wells) with complex structures.

Most of the existing water-based drilling fluid cutting-carrying agents developed in China and foreign countries are modified by using vegetable gum molecules so as to synthesize polymers with special functions, but each of the materials has poor temperature resistance, unstable high-temperature rheological property, complex polymer synthesis process and high product cost, thus the existing water-based drilling fluid cutting-carrying agents can hardly be applied in a large scale.

SUMMARY

The present disclosure aims to provide a modified silicon dioxide material used as a fluorocarbon active agent type super-amphiphobic cutting-carrying agent in the water-based drilling fluid and a preparation method and application thereof, and a water-based drilling fluid and application thereof. The modified silicon dioxide material has a super-amphiphobic property, can maintain the excellent rheological property of a water-based drilling fluid, thereby improving the cutting-carrying performance of the water-based drilling fluid.

In order to fulfill the above-mentioned purposes, a first aspect of the present disclosure provides a preparation method of a modified silicon dioxide material, the method comprises the following steps:

1) subjecting silicon dioxide particles and a silane coupling agent represented by Formula (1) to a first contact reaction in a mixed solvent containing alcohol and water;
2) subjecting the product of the first contact reaction, the compound represented by Formula (2) and the compound represented by Formula (3) to a second contact reaction;
3) subjecting the product of the second contact reaction and the compound represented by Formula (4) to a third contact reaction;

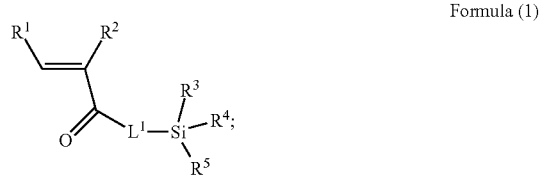

Formula (1)

Formula (2)

Formula (3)

Formula (4) I-R;

Wherein $R^1$, $R^2$, $R^7$ and $R^8$ are each independently selected from the group consisting of H and C1-C6 alkyl; $R^3$, $R^4$, $R^5$ are each independently selected from the group consisting of C1-C6 alkyl and C1-C6 alkoxy; $L^1$ is —O-$L^2$- or C1-C8 alkylene, and $L^1$ is C1-C8 alkylene; $R^6$ is selected from C4-C20 perfluoroalkyl; $R^9$ is selected from H or C1-C6 alkyl; R is C1-C6 alkyl; X is a halogen.

In a second aspect, the present disclosure provides a modified silicon dioxide material prepared with the aforementioned method.

In a third aspect, the present disclosure provides a modified silicon dioxide material, wherein a silicon dioxide of the modified silicon dioxide material is attached with a modifying group represented by Formula (I):

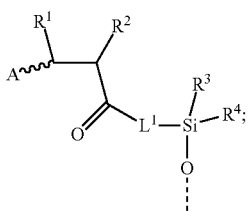

Formula (I)

Wherein the group A is a polymer group containing a structural unit represented by the following Formula (II):

Formula (II)

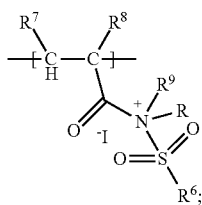

Wherein $R^1$, $R^2$, $R^7$ and $R^8$ are each independently selected from the group consisting of H and C1-C6 alkyl; $R^3$ and $R^4$ are each independently selected from the group consisting of C1-C6 alkyl and C1-C6 alkoxy; $L^1$ is —O-$L^2$- or C1-C8 alkylene, and $L^2$ is C1-C8 alkylene; $R^6$ is selected from C4-C20 perfluoroalkyl; $R^9$ is selected from H or C1-C6 alkyl; R is C1-C6 alkyl.

In a fourth aspect, the present disclosure provides an application of an aforementioned modified silicon dioxide material as a cutting-carrying agent in a water-based drilling fluid.

In a fifth aspect, the present disclosure provides a water-based drilling fluid containing the aforementioned modified silicon dioxide material.

In a sixth aspect, the present disclosure provides an application of the aforementioned water-based drilling fluid in the oil and gas drilling.

The modified silicon dioxide material provided by the present disclosure has super-hydrophobic and super-oleophobic properties and exhibits a super-amphiphobic property. The modified silicon dioxide material can be used as a cutting-carrying agent in a water-based drilling fluid, it may convert the hydrophilic and oleophilic wettability on the surface of rock cuttings into hydrophobic and oleophobic gas wettability, and reduce the relative density of the rock cuttings by adhering a layer of bubbles on the surface thereof; in addition, it improves the cutting-carrying effect of the water-based drilling fluid by using its desirable rheological property, thereby increasing the drilling speed of a complex well and the purification efficiency of a borehole, and further promoting the exploration and development of the unconventional oil and gas reservoirs.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

A first aspect of the present disclosure provides a preparation method of a modified silicon dioxide material, the method comprises the following steps;

1) subjecting silicon dioxide particles and a silane coupling agent represented by Formula (1) to a first contact reaction in a mixed solvent containing alcohol and water;

2) subjecting the product of the first contact reaction, the compound represented by Formula (2) and the compound represented by Formula (3) to a second contact reaction;

3) subjecting the product of the second contact reaction and the compound represented by Formula (4) to a third contact reaction;

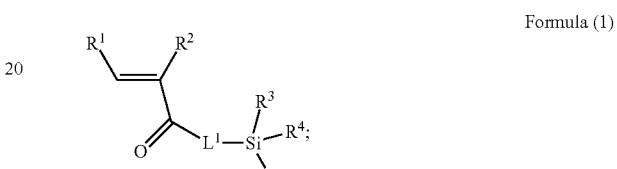

Formula (1)

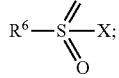

Formula (2)

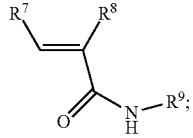

Formula (3)

Formula (4) I-R;

Wherein $R^1$, $R^2$, $R^7$ and $R^8$ are each independently selected from the group consisting of H and C1-C6 alkyl; $R^3$, $R^4$, $R^5$ are each independently selected from the group consisting of C1-C6 alkyl and C1-C6 alkoxy; $L^1$ is —O-$L^2$- or C1-C8 alkylene, and $L^2$ is C1-C8 alkylene; R is selected from C4-C20 perfluoroalkyl; $R^9$ is selected from H or C1-C6 alkyl; R is C1-C6 alkyl; X is a halogen.

According to the present disclosure, wherein the aforementioned C1-C6 alkyl may be, for example, methyl, ethyl, n-propyl, isopropyl, n-butyl, isobutyl, sec-butyl, tert-butyl, n-pentyl, isopentyl, n-hexyl, etc.

According to the present disclosure, wherein the aforementioned C1-C6 alkoxy group may be, for example, methoxy, ethoxy, n-propoxy, isopropoxy, n-butoxy, isobutoxy, sec-butoxy, tert-butoxy, n-pentoxy, isopentoxy, n-hexoxy, etc.

For example, the halogen therein may be fluorine, chlorine, bromine, iodine and the like.

The C1-C8 alkylene may be, for example, —CH$_2$—, —CH$_2$CH$_2$—, —CH$_2$CH$_2$—CH$_2$—, —CH(CH$_3$)—CH$_2$—, —CH$_2$CH(CH$_3$)—, —CH$_2$(CH$_2$)$_2$—CH$_2$, —CH$_2$—CH$_2$—(CH$_3$)—CH$_2$—, —C(CH$_3$)$_2$CH$_2$— or —CH$_2$—C(CH$_3$)$_2$—, etc.

Wherein the above-mentioned C4-C20 perfluoroalkyl refers to an alkyl having 4-20 carbon atoms which are substantially completely substituted with fluorine, the specific examples thereof may be, such as a perfluoro-substituted C4 alkyl (e.g., a perfluoro-substituted n-butyl, which may be represented by CF$_3$—(CF$_2$)$_2$—CF$_2$—), a perfluoro-substituted C5 alkyl (e.g., a perfluoro-substituted n-pentyl, which may be represented by $CF_3—(CF_2)_2—CF_2—$), a perfluoro-substituted C6 alkyl (e.g., a perfluoro-substituted n-hexyl, which may be represented by $CF_3—(CF_2)_4—CF_2—$), a perfluoro-substituted C7 alkyl (e.g., a perfluoro-substituted n-heptyl, which may be represented by $CF_3—(CF_2)_5—CF_2—$), a perfluoro-substituted C8 alkyl (e.g., a perfluoro-substituted n-octyl, which may be represented by $CF_3—(CF_2)_6—CF_2—$), a perfluoro-substituted C9 alkyl (e.g., a perfluoro-substituted n-nonyl, which may be represented by $CF_3—(CF_2)_7—CF_2—$), a perfluoro-substituted C10 alkyl (e.g. a perfluoro-substituted n-decyl, which may be represented by $CF_3—(CF_2)_8—CF_2—$), a perfluoro-substituted C11 alkyl (e.g., a perfluoro-substituted n-undecyl, which may be represented by $CF_3—(CF_2)_9—CF_2—$), a perfluoro-substituted C12 alkyl (e.g. a perfluoro-substituted n-dodecyl, which may be represented by $CF_3—(CF_2)_{10}—CF_2—$), a perfluoro-substituted C14 alkyl (e.g. a perfluoro-substituted n-tetradecyl, which may be represented by $CF_3—(CF_2)_{12}—CF_2—$), a perfluoro-substituted C16 alkyl (e.g. a perfluoro-substituted n-hexadecyl, which may be represented by $CF_6—(CF_2)_{14}—CF_2—$), a perfluoro-substituted C18 alkyl (e.g., a perfluoro-substituted n-octadecyl, which may be represented by $CF_3(CF_2)_{16}—CF_2—$), a perfluoro-substituted C20 alkyl (e.g., a perfluoro-substituted n-eicosyl, which may be represented by $CF_3—(CF_2)_{18}—CF_2—$), and the like.

According to the present disclosure, in order to obtain a super-amphiphobic cutting-carrying agent which has superior cutting-carrying capacity and is more suitable for water-based drilling fluids, the $R^1$, $R^2$, $R^7$ and $R^8$ are preferably independently selected from the group consisting of H and C1-C4 alkyl; $R^3$, $R^4$, $R^5$ are each independently selected from the group consisting of C1-C4 alkyl and C1-C4 alkoxy; $L^1$ is $—O-L^2-$ or C1-C6 alkylene, and $L^2$ is C1-C6 alkylene; $R^6$ is selected from C4-C16 perfluoroalkyl; $R^9$ is selected from H or C1-C4 alkyl; R is C1-C4 alkyl; X is F, Cl or Br.

More preferably, $R^1$, $R^2$, $R^7$ and $R^8$ are each independently selected from the group consisting of H, methyl and ethyl; $R^3$, $R^4$, $R^5$ are each independently selected from methyl, ethyl, n-propyl, methoxy, ethoxy, and n-propoxy; $L^1$ is $—O—CH_2—$, $—O—CH_2CH_2—$, $—O—CH_2CH_2CH_2—$, $—O—CH_2CH_2CH_2CH_2—$, $—O—CH_2CH_2CH_2CH_2CH_2—$, $—CH_2—$, $—CH_2CH_2—$, $—CH_2CH_2CH_2—$, $—CH_2CH_2CH_2CH_2—$ or $—CH_2CH_2CH_2CH_2CH_2$; R is selected from C4-C12 perfluoroalkyl; $R^9$ is selected from H, methyl or ethyl; R is methyl, ethyl or n-propyl; X is F or Cl.

Furthermore preferably, $R^6$ is selected from the group consisting of a perfluoro-substituted n-pentyl, a perfluoro-substituted n-hexyl, a perfluoro-substituted n-heptyl, a perfluoro-substituted n-octyl, a perfluoro-substituted n-nonyl, and a perfluoro-substituted n-decyl.

Among them, the specific examples of the silane coupling agent represented by Formula (1) are preferably one or more of the silane coupling agents represented by the following Formulae:

Formula (1-1): in the Formula (1), $R^1$ is H, $R^2$ is methyl, $L^1$ is $—O—CH_2—$, and each of $R^3$, $R^4$, $R^5$ is methoxy (can also be called γ-methacryloyloxymethyl trimethoxysilane);

Formula (1-2): in the Formula (1), both $R^1$ and $R^2$ are H, $L^1$ is $-O—CH_2—$, and each of $R^3$, $R^4$, $R^5$ is methoxy (can also be called acryloyloxymethyl trimethoxysilane);

Formula (1-3): in the Formula (1), $R^1$ is H, $R^2$ is methyl, $L^1$ is $-O—CH_2CH_2—$, and each of $R^3$, $R^4$, $R^5$ is methoxy (can also be called γ-methacryloyloxyethyl trimethoxysilane);

Formula (1-4): in the Formula (1), both $R^1$ and $R^2$ are H, $L^1$ is $—O—CH_2CH_2—$, and each of $R^3$, $R^4$, $R^5$ is methoxy (can also be called acryloyloxyethyltrimethoxysilane);

Formula (1-5): in the Formula (1), $R^1$ is H, $R^2$ is methyl, $L^1$ is $—O—CH_2CH_2CH—$, and each of $R^3$, $R^4$, $R^5$ is methoxy (can also be called γ-methacryloxypropylt-rimethoxysilane, namely KH 570);

Formula (1-6): in the Formula (1), both $R^1$ and $R^2$ are H, $L^1$ is $—O—CH_2CH_2CH—$, and each of $R^1$, $R^4$, $R^5$ is methoxy (can also be called acryloyloxypropyltrimethoxysilane);

Formula (1-7): in the Formula (1), $R^1$ is H, $R^2$ is methyl, $L^1$ is $—O—CH_2—$, and each of $R^3$, $R^4$, $R^5$ is ethoxy (can also be called γ-methacryloxymethyl triethoxysilane);

Formula (1-8): in the Formula (1), both $R^1$ and $R^2$ are 1, $L^1$ is-$O—CH_2—$, and each of $R^3$, $R^4$, $R^5$ is ethoxy (also called acryloyloxymethyl triethoxysilane);

Formula (1-9): in the Formula (1), $R^1$ is H, $R^2$ is methyl, $L^1$ is $—O—CH_2CH_2—$, and each of $R^3$, $R^4$, $R^5$ is ethoxy (can also be called γ-methacryloxyethyl triethoxysilane);

Formula (1-10): in the Formula (1), both $R^1$ and $R^2$ are H, $L^1$ is $—O—CH_2CH_2—$, and each of $R^3$, $R^4$, $R^5$ is ethoxy (can also be called acryloyloxyethyltriethoxysilane);

Formula (1-11): in the Formula (1), $R^1$ is H, $R^2$ is methyl, $L^1$ is $—O—CH_2CH_2CH—$, and each of $R^3$, $R^4$, $R^5$ is ethoxy (can also be called γ-methacryloxypropyltriethoxysilane);

Formula (1-12): in the Formula (1), both $R^1$ and $R^2$ are H, $L^1$ is $—O—CH_2CH_2CH_2—$, and each of $R^3$, $R^4$, $R^5$ is ethoxy (can also be called acryloyloxypropyltriethoxysi-lane).

Among them, the specific examples of the compound represented by the Formula (2) are preferably one or more of perfluoroalkyl halogenated sulfonyl groups represented by the following Formulae:

Formula (2-1): in Formula (2), $R^6$ is a perfluoro-substituted n-pentyl, X is F (can also be called perfluoropentylsulfonyl fluoride);

Formula (2-2): in Formula (2), $R^6$ is selected from perfluoro-substituted n-hexyl, X is F (can also be called perfluorohexylsulfonyl fluoride);

Formula (2-3): in Formula (2), $R^6$ is selected from perfluoro-substituted n-heptyl, and X is F (can also be called perfluoroheptylsulfonyl fluoride);

Formula (2-4): in Formula (2), $R^6$ is selected from perfluoro-substituted n-octyl, X is F (can also be called perfluorooctylsulfonyl fluoride);

Formula (2-5): in Formula (2), $R^6$ is selected from perfluoro-substituted n-nonyl, X is F (can also be called perfluorononylsulfonyl fluoride);

Formula (2-6): in Formula (2), $R^6$ is selected from perfluoro-substituted n-decyl, and X is F (can also be called perfluorodecylsulfonyl fluoride);

Formula (2-7): in Formula (2), $R^6$ is a perfluoro-substituted n-pentyl, X is Cl (can also be called perfluoropentylsulfonyl chloride);

Formula (2-8): in Formula (2), $R^6$ is selected from perfluoro-substituted n-hexyl, X is Cl (can also be called perfluorohexylsulfonyl chloride);

Formula (2-9): in Formula (2), $R^6$ is selected from perfluoro-substituted n-heptyl, and X is Cl (can also be called perfluoroheptylsulfonyl chloride);

Formula (2-10): in Formula (2), $R^6$ is selected from perfluoro-substituted n-octyl, X is Cl (can also be called perfluorooctylsulfonyl chloride);

Formula (2-11): in Formula (2), $R^6$ is selected from perfluoro-substituted n-nonyl, X is Cl (can also be called perfluorononylsulfonyl chloride);

Formula (2-12): in Formula (2), $R^6$ is selected from perfluoro-substituted n-decyl, X is Cl (can also be called perfluorodecylsulfonyl chloride).

Among them, the specific examples of the compound represented by the Formula (3) are preferably one or more of the compounds represented by the following Formulae:

Formula (3-): in the Formula (3), each of $R^7$, $R^8$ and $R^9$ is H (i.e., acrylamide);

Formula (3-2): in the Formula (3), both $R^7$ and $R^9$ are H, and $R^8$ is methyl (i.e., methacrylamide).

Among them, the specific examples of the compound represented by the Formula (4) are preferably one or more of the compounds represented by the following Formulae:

Formula (4-1): in the Formula (4), R is methyl (i.e., methyl iodide);

Formula (4-2): in the Formula (4), R is ethyl (i.e., iodoethane).

According to the present disclosure, a specifically modified silicon dioxide material can be produced by using the above method of the present disclosure, the material can be used as a cutting-carrying agent for a water-based drilling fluid, the material has temperature resistance performance, and it can form a polymer-modified multi-stage nano-micrometer structure, such that the amphiphobic properties can be obtained to convert the hydrophilic and oleophilic wettability on the surface of rock cuttings into hydrophobic and oleophobic gas wettability; and the relative density of rock cuttings can be reduced through the bubble effect provided by the modified group, and the water-based drilling fluid containing the modified silicon dioxide material has an excellent cutting-carrying effect under the condition of the improved rheological property.

According to the present disclosure, although in the step 1), a silane coupling agent modified silicon dioxide with a corresponding structure can be formed by a contact reaction of the silicon dioxide particles in a mixed solvent containing alcohol and water with a silane coupling agent represented by Formula (1), this step of the present disclosure mainly aims to form reactive silicon hydroxyl through hydrolysis of the silane coupling agent to perform reaction (e.g., etherification reaction) with active groups (e.g., hydroxyl groups) on the silicon dioxide, thereby allowing the silane coupling agent to bond with the surface of the silicon dioxide in this step. The silicon dioxide therein may be a commercially available silicon dioxide or be prepared by a method generally used in the art, the present disclosure does not impose a specific limitation thereto. The silicon dioxide particles used in the present disclosure preferably have a particle size of 50 nm to 200 nm, more preferably 80 nm to 100 nm, and in particular the silicon dioxide particles with spherical structure, however, other silicon dioxide structures suitable for use as cutting-carrying agents are also applicable in the present disclosure.

According to the present disclosure, in order to prepare a modified silicon dioxide material with a more advantageous cutting-carrying effect, it is preferable that a molar ratio of used amounts of the silicon dioxide to the silane coupling agent represented by Formula (1) is 1:0.05-1 based on the amount of silicon. It was found that by means of adjusting the molar ratio of used amounts, a modified silicon dioxide material used as a cutting-carrying agent having more excellent properties can be prepared when the molar ratio of silicon dioxide and the silane coupling agent represented by Formula (1) is 1:0.08-0.5, in particular 1:0.1-0.3 based on the amount of silicon.

According to the present disclosure, for the sake of promoting the surface modification of silicon dioxide, the present disclosure employs a mixed solvent containing alcohol and water, and the alcohol solvent therein may be selected from a variety of alcohol solvents, preferably one or more from the group consisting of ethanol, methanol, n-propanol and isopropanol. The volume ratio of the alcohol solvent to water in the mixed solvent containing alcohol and water is preferably 1: 2-10.

According to the present disclosure, the used amount of the mixed solvent containing alcohol and water may vary within a wide range, preferably the used amount of the mixed solvent containing alcohol and water is used in an amount of 50-200 mL relative to 1 g of silicon dioxide.

According to the present disclosure, preferably, the conditions of the first contact reaction comprise: the temperature is within a range of 30-70° C., and the time is 25-120 min. More preferably, the conditions of the first contact reaction include: the temperature is 30-60° C., and the time is 30-100 min. It is of course most suitable to adopt the milder and lower energy consumption conditions, for this reason, it is particularly preferred that the conditions of the first contact reaction comprise: the temperature is within a range of 30-45° C., and the time is 30-60 min.

Wherein the feeding mode of the first contact reaction may be carried out in various forms, preferably the silicon dioxide is dispersed in a mixed solvent containing alcohol and water to prepare a silicon dioxide dispersion liquid, and the silane coupling agent is then introduced.

According to the present disclosure, the step 2) is subjecting the product of the first contact reaction, the compound represented by Formula (2) and the compound represented by Formula (3) to a second contact reaction, it may allow the silicon dioxide modified by the silane coupling agent represented by Formula (1) to further react with the compound represented by Formula (2) and the compound represented by Formula (3), the reaction mainly refers to that the carbon-carbon double bond in the compound represented by Formula (3) and the carbon-carbon double bond in the silane coupling agent are opened and then connected to each other, and in the meanwhile, the compound represented by Formula (3) is spontaneously polymerized, thus a polymer group formed by the polymerization of the compound represented by Formula (3) can be connected to the silane coupling agent. The compound represented by Formula (2) can perform substitution reaction with active hydrogen on nitrogen in the compound represented by Formula (3), so that the perfluoroalkyl sulfonyl is connected to nitrogen of a structural unit provided by the compound represented by Formula (3), thereby allowing a silane coupling agent group of silicon dioxide to be connected with the long-chain residues of acrylamide polymers containing the perfluoroalkyl sulfonyl provided by the compound represented by Formula (2), such that the fluorocarbon active agent modified material is formed.

Wherein the product of the first contact reaction may be the entire reaction system after the first contact reaction, the reaction system after the first contact reaction may be directly used in the reaction of step 2) without carrying out purification.

In order to prepare the cutting-carrying agent with more appropriate rheological property and amphiphobic property, a molar ratio of used amounts of the silicon dioxide based on the amount of silicon to the compound represented by Formula (3) is preferably 1: 1-10. By means of adjusting the molar ratio of the used amounts, the present disclosure controls the molar ratio of used amounts of silicon dioxide based on the amount of silicon and the compound represented by Formula (3) to be 1: 2-8, preferably 1: 3-6, particularly preferably 1: 3-5, the modified silicon dioxide material with more excellent performance for the cutting-carrying agent can be obtained.

Wherein, it is preferable that a molar ratio of used amounts of the compound represented by Formula (2) to the compound represented by Formula (3) is 0.05-2:1, preferably 0.1-1:1, more preferably 0.15-0.6:1; with such a molar ratio of used amounts, it is possible to prepare a modified silicon dioxide material obtained by the present disclosure having a more suitable amount of fluorocarbon groups and a more suitable polymer residue chain.

According to the present disclosure, the conditions of the second contact reaction preferably include: the temperature is within a range of 30-70° C. and the time is 1.5-5 hours. More preferably, the conditions of the second contact reaction comprise: the temperature is within a range of 30-60° C. (further preferably 30-45° C.), and the time is 2-4 hours.

According to the present disclosure, the step 3) is subjecting the product of the second contact reaction and the compound represented by Formula (4) to a third contact reaction, the reaction mainly means that the nitrogen on the compound represented by Formula (3) after the second contact reaction reacts with the compound represented by Formula (4) to form a cationic quaternary ammonium salt structure, such that the polymer residue chain of the modified silicon dioxide material comprises a structural unit of the quaternary ammonium salt cation.

Wherein the product of the second contact reaction may be the entire reaction system after the second contact reaction, the reaction system after the second contact reaction may be directly used in the reaction of step 3) without carrying out purification.

In order to prepare a cutting-carrying agent with more excellent cutting-carrying effect, it is preferable that a molar ratio of used amounts of the compound represented by Formula (4) to the compound represented by Formula (3) is 0.05-0.9:1, preferably 0.1-0.6:1.

According to the present disclosure, the conditions of the third contact reaction preferably comprise: the temperature is within a range of 10-30° C., and the time is 10-120 min. More preferably, the conditions of the third contact reaction include: the temperature is within a range of 15-25° C., and the time is 20-60 min.

In a second aspect, the present disclosure provides a modified silicon dioxide material prepared with the aforementioned method.

It should be comprehended that the modified silicon dioxide material prepared with the aforementioned method provided by the second aspect may be the whole reaction system after the third contact reaction, or refers to the reaction product after the solvent is removed, or refers to the purified product, or certainly may be the modified silicon dioxide material described in the following structure, each of them falls into the scope of the second aspect of the present disclosure.

In a third aspect, the present disclosure provides a modified silicon dioxide material, wherein a silicon dioxide of the modified silicon dioxide material is attached with a modifying group represented by Formula (I):

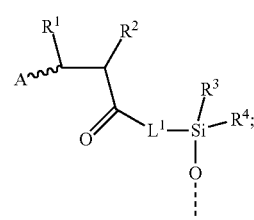

Formula (I)

Wherein the group A is a polymer group containing a structural unit represented by the following Formula (I):

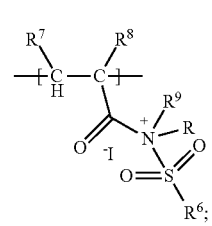

Formula (II)

Wherein $R^1$, $R^2$, $R^7$ and $R^8$ are each independently selected from the group consisting of H and C1-C6 alkyl; $R^3$ and $R^4$ are each independently selected from the group consisting of C1-C6 alkyl and C1-C6 alkoxy; $L^1$ is —O-$L^2$- or C1-C8 alkylene, and $L^2$ is C1-C8 alkylene; $R^6$ is selected from C4-C20 perfluoroalkyl; $R^9$ is selected from H or C1-C6 alkyl; R is C1-C6 alkyl.

According to the present disclosure, the aforementioned groups have been described in the above text, and will be further referred to herein without providing unnecessary details.

As mentioned above, it is preferable that the silicon dioxide is a silicon dioxide particle having a particle size of 50 nm to 200 nm, preferably 80 nm to 100 nm. The silicon dioxide is particularly preferably a silicon dioxide particle having a spherical structure, but other silicon dioxide structures suitable for cutting-carrying agents are also applicable in the present disclosure.

The modified silicon dioxide material of the third aspect of the present disclosure falls within the scope of the present disclosure as long as it contains the modifying group represented by Formula (I) and the polymer group A comprises the structural unit represented by Formula (I). Wherein the modifying group represented by Formula (I) and the polymer group A are obtained by reacting the silicon dioxide described above with a silane coupling agent represented by Formula (1), a compound represented by Formula (2), a compound represented by Formula (3), and a compound represented by Formula (4).

Wherein the modified silicon dioxide material preferably has a molar ratio of silicon dioxide to a structure provided by the silane coupling agent represented by the Formula (1) of 1:0.05-0.8, preferably 1:0.08-0.5, more preferably 1:0.1-0.3 based on the amount of silicon.

Wherein it is preferable that the modified silicon dioxide material has a molar ratio of silicon dioxide based on the amount of silicon to a structure provided by the compound represented by Formula (3) of 1: 2-8, preferably 1: 3-6, more preferably 1: 3-5.

Wherein it is preferable that the modified silicon dioxide material has a molar ratio of the perfluoroalkylsulfonyl group provided by the compound represented by Formula (2) to the structural unit provided by the compound represented by Formula (3) to be 0.05-0.9:1, preferably 0.1-0.6:1.

Wherein it is preferable the modified silicon dioxide material has a molar ratio of the structural unit containing quaternary ammonium salt cation to the structural unit provided by the compound represented by the Formula (3) to be 0.05-0.9:1, preferably 0.1-0.6:1.

In a fourth aspect, the present disclosure provides an application of the aforementioned modified silicon dioxide material as a cutting-carrying agent in a water-based drilling fluid.

As described above, the modified silicon dioxide materials of the present disclosure can be used as a cutting-carrying agent in s water-based drilling fluid, and may produce excellent cutting-carrying effects based on their high temperature resistance, super-amphiphobic properties, rheological properties and the like.

In a fifth aspect, the present disclosure provides a water-based drilling fluid containing the aforementioned modified silicon dioxide material.

According to the present disclosure, as mentioned above, the water-based drilling fluid formed by using the aforementioned modified silicon dioxide material as a cutting-carrying agent can produce an excellent cutting-carrying effect, and the content of the modified silicon dioxide material may vary within a wide range, and preferably, the content of the modified silicon dioxide material measured by the solid content is 0.1-0.5% by weight, preferably 0.2-0.5% by weight, based on the total weight of the water-based drilling fluid excluding the weighting agent.

In addition, the drilling fluid of the present disclosure as a water-based drilling fluid may further contain additives conventionally used in the water-based drilling fluid in the technical field, for example, based on the total weight of the water-based drilling fluid excluding the weighting agent, the water-based drilling fluid may comprise 3-6 wt % of bentonite (which may be, for example, sodium bentonite and/or calcium bentonite), 0.1-1 wt % of a temperature-resistant filtrate reducer (which may be, for example, one or more of the group consisting of modified sodium humate polycondensate (KJAN), phenolic resin, sulfomethyl phenolic resin and sulfomethyl lignite resin, etc.), 0.5-2 wt % of a salt-resistant filtrate reducer (one or more of the group consisting of cellulose ether derivatives (PAC), starch, modified starch, carboxymethy cellulose, etc.), 0.5 to 2 wt % of a plugging agent (for example, one or more of the group consisting of ultrafine calcium carbonate, white asphalt, a commercially available plugging agent ZHFD-1, etc.), and a weighting agent (which may be, for example, barite having a barium sulfate content greater than 90 wt %), organic salts (one or more of the group consisting of weight-1, weight-2 (its active ingredient is potassium formate), weight-3, organic sodium salt GD-WT), etc.) to enable the water-based drilling fluid to obtain a desired density, such as 1-3 g/cm$^3$.

In a sixth aspect, the present disclosure provides an application of the aforementioned water-based drilling fluid in the oil and gas drilling.

When the modified silicon dioxide material prepared by the present disclosure is used as a cutting-carrying agent, it can favorably improve the interfacial tension of a solution under the condition of low concentration; and it has a desirable temperature resistance, and the tolerable temperature may be 300° C. or more; the synthesis process is simple, the cost is low, it is environmentally friendly and pollution-free; the surface free energy of the solid surface can be effectively reduced, and a lyophobic effect is achieved; more importantly, the water-based drilling fluid containing the modified silicon dioxide material of the present disclosure as the cutting-carrying agent may effectively improve the cutting-carrying efficiency of the drilling fluid and reduce the hazard of forming a rock cutting bed, and finally fulfill the purpose of protecting a reservoir stratum.

The present disclosure will be described in detail below with reference to examples.

In the following examples, the concentration of the modified silicon dioxide materials when used as a cutting-carrying agents is calculated based on the solid content of the modified silicon dioxide materials.

The raw material silicon dioxide is the silicon dioxide particle having a particle size of about 100 nm.

Example 1

The example illustrates the modified silicon dioxide material and the method for preparing the same of the present disclosure.

1 g of silicon dioxide was added into 100 mL of alcohol-water mixed solution (the volume ratio of ethanol to water is 1:2), and an ultrasonic dispersion was performed for 30 min; then the KH570 (wherein the molar ratio of silicon dioxide to KH570 was 1:0.2 based the amount of silicon) was added and mixed uniformly, the mixture was heated to raise the temperature to 45° C. for carrying out reaction for 60 min; the acrylamide and perfluorooctyl sulfonyl fluoride (wherein the molar ratio of the silicon dioxide based on the amount of silicon to the acrylamide to the perfuorooctyl sulfonyl fluoride was 1:5:1.5) were subsequently added to continue the reaction at a temperature of 45° C. for 3 hours, the reactants were cooled to room temperature (about 25° C.), then the methyl iodide (wherein the molar ratio of the amount of the methyl iodide to the amount of the acrylamide was 0.2:1) was added and subjected to reaction for 60 minutes, the obtained product was exactly the modified silicon dioxide material FCA-1.

Example 2

The example illustrates the modified silicon dioxide material and the method for preparing the same of the present disclosure.

1 g of silicon dioxide was added into 100 mL of alcohol-water mixed solution (the volume ratio of methanol to water is 1:5), and an ultrasonic dispersion was performed for 30 min; then the γ-methacryloxypropyltriethoxysilane (wherein the molar ratio of silicon dioxide to γ-methacryloxypropyltriethoxysilane is 1:0.3 based the amount of silicon) was added and mixed uniformly, the mixture was heated to raise the temperature to 60° C. for carrying out reaction for 90 min; the acrylamide and perfluorohexyl sulfonyl fluoride (wherein the molar ratio of the silicon dioxide based on the amount of silicon to the acrylamide to the perfluorohexyl sulfonyl fluoride was 1:2:4) were subsequently added to continue the reaction at a temperature of 60° C. for 4 hours, the reactants were cooled to room temperature (about 25° C.), then the iodoethane (wherein the molar ratio of the amount of the iodoethane to the amount of the acrylamide was 1.5:4) was added and subjected to reaction for 45 min, the obtained product was exactly the modified silicon dioxide material FCA-2.

Example 3

The example illustrates the modified silicon dioxide material and the method for preparing the same of the present disclosure.

1 g of silicon dioxide was added into 100 mL of alcohol-water mixed solution (the volume ratio of ethanol to water was 1:2), and an ultrasonic dispersion was performed for 30 min; then the KH570 (wherein the molar ratio of silicon dioxide to KH570 is 1:0.3 based the amount of silicon) was added and mixed uniformly, the mixture was heated to raise the temperature to 30 for carrying out reaction for 90 min; the acrylamide and perfluorooctyl sulfonyl fluoride (wherein the molar ratio of the silicon dioxide based on the amount of silicon to the acrylamide to the perfluorooctyl sulfonyl fluoride was 1:1:5) were subsequently added to continue the reaction at a temperature of 30° C. for 4 hours, the reactants were cooled to room temperature (about 25° C.), then the methyl iodide (wherein the molar ratio of the amount of the methyl iodide to the amount of the acrylamide was 0.3:1) was added and subjected to reaction for 30 minutes, the obtained product was exactly the modified silicon dioxide material FCA-3.

Example 4

The example illustrates the modified silicon dioxide material and the method for preparing the same of the present disclosure.

The modified silicon dioxide material was prepared with the same method as that in Example 1, except for that the KH1570 was added in an amount such that the molar ratio of silicon dioxide to KH570 was 1:0.05 based the amount of silicon, thereby preparing a modified silicon dioxide material FCA-4.

Example 5

The example illustrates the modified silicon dioxide material and the method for preparing the same of the present disclosure.

The modified silicon dioxide material was prepared with the same method as that in Example 1, except for that the KH570 was added in an amount such that the molar ratio of silicon dioxide to KH570 was 1:1 based the amount of silicon, thereby preparing a modified silicon dioxide material FCA-5.

Example 6

The example illustrates the modified silicon dioxide material and the method for preparing the same of the present disclosure.

The modified silicon dioxide material was prepared with the same method as that in Example 1, except for that the acrylamide and perfluorooctylsulfonyl fluoride were added in an amount such that the molar ratio of the silicon dioxide based on the amount of silicon to the acrylamide to the perfluorooctyl sulfonyl fluoride was 1:1:1.5, thereby preparing a modified silicon dioxide material FCA-6.

Example 7

The example illustrates the modified silicon dioxide material and the method for preparing the same of the present disclosure.

The modified silicon dioxide material was prepared with the same method as that in Example 1, except for that the acrylamide and perfluorooctyl sulfonyl fluoride were added in an amount such that the molar ratio of the silicon dioxide based on the amount of silicon to the acrylamide to the perfluorooctyl sulfonyl fluoride was 1:10:1.5, thereby preparing a modified silicon dioxide material FCA-7.

Comparative Example 1

The modified silicon dioxide material was prepared with the same method as that in Example 1, except for that the perfluorooctyl sulfonyl fluoride was not added, subsequently preparing a modified silicon dioxide material DFCA-1.

Comparative Example 2

The modified silicon dioxide material was prepared with the same method as that in Example 1, except for that the methyl iodide was not added, subsequently preparing a modified silicon dioxide material DFCA-2.

Test Example 1

Evaluation of surface tension: the modified silicon dioxide material was dispersed in water to prepare cutting-carrying agent solutions with different concentrations, and the surface tension of the prepared cutting-carrying agent solutions with different concentrations was measured under a condition of 25° C. by adopting a platinum plate method (specifically refer to the method described in the national standard GB/T18396-2001 of China); the results were shown in Table 1.

TABLE 1

|  | Surface tension mN/m | | | | |
| --- | --- | --- | --- | --- | --- |
| Concentrations | 0.1 | 0.2 | 0.3 | 0.4 | 0.5 |
| FCA-1 | 23.4 | 17.3 | 13.5 | 12.1 | 11.9 |
| FCA-2 | 24.5 | 17.4 | 14.1 | 12.6 | 12.5 |
| FCA-3 | 25.8 | 18.6 | 14.4 | 13.5 | 13.3 |
| FCA-4 | 28.2 | 21.5 | 16.5 | 15.2 | 15.0 |
| FCA-5 | 30,6 | 24.4 | 19.7 | 18.9 | 18.2 |
| FCA-6 | 37.5 | 30.6 | 22.5 | 22.2 | 21.5 |
| FCA-7 | 38.2 | 33.4 | 24.3 | 23.5 | 23.0 |
| DFCA-1 | 52.3 | 46.5 | 37.6 | 36.1 | 35.7 |
| DFCA-2 | 55.1 | 47.2 | 38.8 | 37.9 | 37.1 |

As can be seen from Table 1 that the modified silicon dioxide material of the present disclosure has a favorable effect of improving solution surface, and can effectively reduce the surface tension of deionized water, and in particular, the modified silicon dioxide material prepared by the preferred method may result in the lower surface tension at the same concentration, and particularly, the surface tension can be reduced to 13.5 mN/m or below by using the modified silicon dioxide material at a concentration of 0.3%.

Test Example 2

Measuring the hydrophobic and oleophobic performances of the rock surface: 0.3 wt % aqueous solutions of the aforementioned modified silicon dioxide materials were prepared respectively as solutions to be tested, and 5 solutions to be tested with different concentrations (0.1 wt %, 0.2 wt %, 0.3 wt %, 0.4 wt % and 0.5 wt %) of the modified silicon dioxide material FCA-1 were prepared respectively; the artificial rock cores were put into the modified silicon dioxide material solutions to be tested, and were soaked at a temperature of 160° C. for 8 hours; the rock cores were taken out, and were cooled and dried under natural conditions, and then the contact angles $\theta_o$, and $\theta_w$, of the oil and water phases on the surface of the rock cores were measured respectively by using a contact angle measuring instrument (the contact angle measuring instrument with a model number JC2000D3 manufactured by the Shanghai Powereach digital technology equipment Co., Ltd.), the measurement results were shown in Table 2, wherein the oil phase test solution was n-hexadecane, and the water phase test solution was distilled water.

TABLE 2

| Modified silicon dioxide material/Concentration wt % | $\theta_w/(°)$ | $\theta_o/(°)$ |
|---|---|---|
| FCA-1/0.1 | 98.4 | 72.4 |
| FCA-1/0.2 | 117.3 | 108.1 |
| FCA-1/0.3 | 163.5 | 151.2 |
| FCA-1/0.4 | 164.1 | 152.5 |
| FCA-1/0.5 | 165.3 | 152.4 |
| FCA-2/0.3 | 159.8 | 145.6 |
| FCA-3/0.3 | 153.5 | 141.2 |
| FCA-4/0.3 | 151.3 | 140.7 |
| FCA-5/0.3 | 148.2 | 135.9 |
| FCA-6/0.3 | 136.7 | 128.1 |
| FCA-7/0.3 | 135.4 | 128.2 |
| DFCA-1/0.3 | 115.4 | 98.2 |
| DFCA-2/0.3 | 112.3 | 95.1 |

As can be seen from the data in Table 2 that the modified silicon dioxide materials provided by the present disclosure can cause the rock surface to be super-hydrophobic and super-oleophobic, thereby producing the super-amphiphobic effect on the rock surface.

Test Example 3

The modified silicon dioxide material FCA-1 was dispersed in water to prepare solutions of the cutting-carrying agents with different concentrations, and the solutions were added into a rotating drop interfacial tension meter to measure the oil-water interfacial tension (specifically refer to the method described in the standard SY/T5370-1999 of China), and the results were shown in Table 3.

TABLE 3

| Concentration/ | Surface tension mN/m | | | | |
|---|---|---|---|---|---|
| wt % | 0.1 | 0.2 | 0.3 | 0.4 | 0.5 |
| FCA-1 | 4.71 × $10^{-1}$ | 8.2 × $10^{-2}$ | 5.17 × $10^{-3}$ | 4.88 × $10^{-3}$ | 5.12 × $10^{-3}$ |

As can be seen from the data in Table 3 that a small amount of modified silicon dioxide material can effectively reduce the oil-water interfacial tension, when the concentration of the modified silicon dioxide material reaches 0.3 wt % or more, the oil-water interfacial tension is reduced to $10^{-3}$ orders of magnitude, it not only facilitates improvement of the rock surface wettability, but also be conducive to the bubble performance of the system.

Test Example 4

Components of the water-based drilling fluid Y0: 4 wt % of sodium-based bentonite (purchased from Weifang Huawei Bentonite Technical Research Center, hereinafter the same), 0.5 wt % of filtrate reducer sulfomethyl phenolic resin (purchased from Xinxiang City Xinlei Oilfield Additives Co., Ltd. with a model name SMP-II, hereinafter the same), 1 wt % of plugging agent white asphalt (purchased from Henan Ocean Chemical Co., Ltd.) 1 wt % of starch, and water and barite were added to adjust the density of the drilling fluid to be 1.1 g/cm.

Components of the water-based drilling fluids Y1-Y7: the water-based drilling fluids Y1-Y7 have the substantially same components as the water-based drilling fluid Y0, except for that 0.3 percent by weight of modified silicon dioxide materials FCA-1 to FCA-7 are further added respectively as the cutting-carrying agents.

Components of the water-based drilling fluid DY1-DY2: the water-based drilling fluids DY1-DY2 have the substantially same components as the water-based drilling fluid Y0, except for that 0.3 percent by weight of modified silicon dioxide materials DFCA-1 and DFCA-2 are further added respectively as the cutting-carrying agents.

The rheological property and filtrate loss reduction performance of aforementioned water-based drilling fluids before aging were tested, the results are shown in Table 4, wherein:

AV refers to an apparent viscosity, it is measured by FANN Six-Speed Viscosity meter, the unit is mPa·s, $$AV = \frac{1}{2}\theta_{600};$$

PV refers to a plastic viscosity, it is measured by FANN Six-Speed Viscosity meter, the unit is mPa·s, $PV=\theta_{600}-\theta_{300}$;

YP refers to a dynamic shear force, it is obtained from the measured data of FANN Six-Speed Viscosity meter, the unit is Pa, $YP=0.511(\theta_{300}-PV)$;

API refers to a medium-pressure filtrate loss, it is measured by a medium-pressure filtrate loss instrument, the unit is mL.

TABLE 4

| Drilling fluids | AV mPa s | PV mPa s | UP Pa | API mL |
|---|---|---|---|---|
| Y0 | 8 | 5 | 3.07 | 22 |
| Y1 | 18.5 | 11 | 7.67 | 8 |
| Y2 | 16.5 | 10 | 6.64 | 9 |
| Y3 | 15 | 10 | 5.11 | 9 |
| Y4 | 14.5 | 10 | 4.60 | 10 |
| Y5 | 14 | 10 | 4.09 | 10 |
| Y6 | 13 | 11 | 2.04 | 15 |
| Y7 | 13 | 10 | 3.07 | 15 |
| DY1 | 12 | 8 | 4.09 | 18 |
| DY2 | 11 | 7 | 4.09 | 18 |

As can be seen from the data in Table 4 that the drilling fluid added with the modified silicon dioxide material of the present disclosure as a cutting-carrying agent not only improves the lifting-shearing force of the system, but also reduces the filtration loss of the system, it is beneficial to enhancing the lifting-shearing and cutting-carrying effects of the system in regard to the borehole rock cutting, it is more conducive to protection of a reservoir stratum by the drilling fluid.

Test Example 5

50 g of rock cutting was added into 350 mL of the drilling fluids Y0-Y7 and DY1-DY2 respectively, the cutting-carrying effects of the individual water-based drilling fluids were evaluated by using a shaft simulator, and the cutting-carrying effects of the water-based drilling fluids were calculated, the results were shown in Table 5.

Wherein the cutting-carrying efficiency refers to the percentage of the mass of the carried rock cutting in the mass of the added rock cutting.

TABLE 5

| Drilling fluids | Mass of the carried rock cutting/g | Cutting-carrying efficiency/% |
|---|---|---|
| Y0 | 18 | 36 |
| Y1 | 46 | 92 |
| Y2 | 45 | 90 |
| Y3 | 45 | 90 |
| Y4 | 42 | 84 |
| Y5 | 41 | 82 |
| Y6 | 36 | 72 |
| Y7 | 35 | 70 |
| DY1 | 29 | 58 |
| DY2 | 28 | 56 |

As be seen from the data in Table 5, the drilling fluid containing the modified silicon dioxide material of the present disclosure as the cutting-carrying agent may produce a desirable cutting-carrying effect at a small added amount.

The above content describes in detail the preferred embodiments of the present disclosure, but the present disclosure is not limited thereto. A variety of simple modifications can be made to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A modified silicon dioxide material, wherein a silicon dioxide of the modified silicon dioxide material is attached with a modifying group represented by Formula (I):

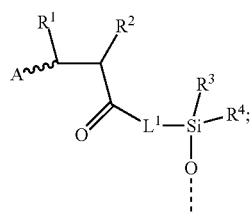

Formula (I)

wherein the group A is a polymer group consisting of structural unit represented by the following Formula (II):

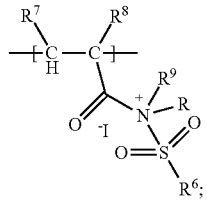

Formula (II)

wherein $R^1$, $R^2$, $R^7$ and $R^8$ are each independently selected from the group consisting of H and C1-C6 alkyl; $R^3$ and $R^4$ are each independently selected from the group consisting of C1-C6 alkyl and C1-C6 alkoxy; $L^1$ is —O-$L^2$- or C1-C8 alkylene, and $L^2$ is C1-C8 alkylene; $R^6$ is selected from C4-C20 perfluoroalkyl; $R^9$ is selected from H or C1-C6 alkyl; R is C1-C6 alkyl.

2. The modified silicon dioxide material of claim 1, wherein $R^1$, $R^2$, $R^7$ and $R^8$ are independently selected from H and C1-C4 alkyl; $R^3$, $R^4$, $R^5$ are each independently selected from the group consisting of C1-C4 alkyl and C1-C4 alkoxy; L is —O-$L^2$- or C1-C6 alkylene, and $L^2$ is C1-C6 alkylene; $R^6$ is selected from C4-C16 perfluoroalkyl; $R^9$ is selected from H or C1-C4 alkyl; R is C1-C4 alkyl; X is F, Cl or Br.

3. The modified silicon dioxide material of claim 1, wherein $R^1$, $R^2$, $R^7$ and $R^8$ are each independently selected from H, methyl and ethyl; $R^3$, $R^4$, $R^5$ are each independently selected from methyl, ethyl, n-propyl, methoxy, ethoxy, and n-propoxy; $L^1$ is —O—$CH_2$—, —O—$CH_2CH_2$—, —O—$CH_2CH_2CH_2$—, —O—$CH_2CH_2CH_2CH_2$—, —O—$CH_2CH_2CH_2CH_2CH_2CH_2$—, —$CH_2$—, —$CH_2CH_2$—, —$CH_2CH_2CH_2$—, —$CH_2CH_2CH_2CH_2$— or —$CH_2CH_2CH_2CH_2CH_2$—; $R^6$ is selected from C4-C12 perfluoroalkyl; $R^9$ is selected from H, methyl or ethyl; R is methyl, ethyl or n-propyl; X is F or Cl.

4. The modified silicon dioxide material of claim 3, wherein $R^6$ is selected from the group consisting of a perfluoro-substituted n-pentyl, a perfluoro-substituted n-hexyl, a perfluoro-substituted n-heptyl, a perfluoro-substituted n-octyl, a perfluoro-substituted n-nonyl and a perfluoro-substituted n-decyl.

5. The modified silicon dioxide material of claim 1, wherein the silicon dioxide is a silicon dioxide particle having a particle size of 50 nm to 200 nm.

6. The modified silicon dioxide material of claim 5, wherein the silicon dioxide is a silicon dioxide particle having a particle size of 80 nm to 100 nm.

7. A water-based drilling fluid containing a modified silicon dioxide material of claim 1.

* * * * *